United States Patent [19]

Coughlin et al.

[11] Patent Number: 4,779,080
[45] Date of Patent: Oct. 18, 1988

[54] ELECTRONIC INFORMATION DISPLAY SYSTEMS

[75] Inventors: Bernard J. Coughlin, Crawley; David E. Penna; Simon R. Turner, both of Redhill, England

[73] Assignee: U.S. Philips Corporation, New York, N.Y.

[21] Appl. No.: 836,791

[22] Filed: Mar. 6, 1986

[30] Foreign Application Priority Data

Mar. 6, 1985 [GB] United Kingdom ............... 8505739

[51] Int. Cl.[4] ............................................. G09G 1/14
[52] U.S. Cl. ................................. 340/712; 340/750; 340/721; 364/900; 364/200
[58] Field of Search ............... 340/711, 712, 750, 724, 340/721, 745, 798; 364/900, 200; 434/156, 169

[56] References Cited

U.S. PATENT DOCUMENTS

| | | | |
|---|---|---|---|
| 4,310,839 | 1/1982 | Schwerdt | 340/712 |
| 4,396,977 | 8/1983 | Slater et al. | 340/722 |
| 4,414,624 | 11/1983 | Ahuja et al. | 340/721 |
| 4,550,386 | 10/1985 | Hirosawa et al. | 364/900 |
| 4,587,520 | 5/1986 | Astle | 340/712 |
| 4,649,380 | 3/1987 | Penna | 340/721 |

FOREIGN PATENT DOCUMENTS 0066674 12/1982 European Pat. Off. .
1046757 10/1966 United Kingdom .
1582941 1/1981 United Kingdom ............... 340/712

OTHER PUBLICATIONS

"Compact discs move from music to computers", New Scientist, Nov. 15, 1984, p. 27.
Philips Technical Review, vol. 40, No. 6, 1982, pp. 149-180.

Primary Examiner—John W. Caldwell, Sr.
Assistant Examiner—Alvin Oberley
Attorney, Agent, or Firm—Thomas A. Briody; Algy Tamoshunas; Marianne R. Rich

[57] ABSTRACT

An electronic information display system which is organized as a reference information display system. The system comprises a reference source in the form of a compact disc CD ROM, which constitutes a mass readonly memory for the system. The disc contains text, graphics and/or sound data portions for a plurality of items of information. The disc also contains a list of these items together with addresses for their respective data portions. The system is processor-controlled such that the list and addresses are read from the disc into a programme memory. Using scrolling and/or selection techniques, the list can then be displayed a part at a time until a required item is found. Selection of this item will result in its data portions being transferred from the CD ROM to the programme memory where they can be accessed for use (i.e. visual or audible).

9 Claims, 2 Drawing Sheets

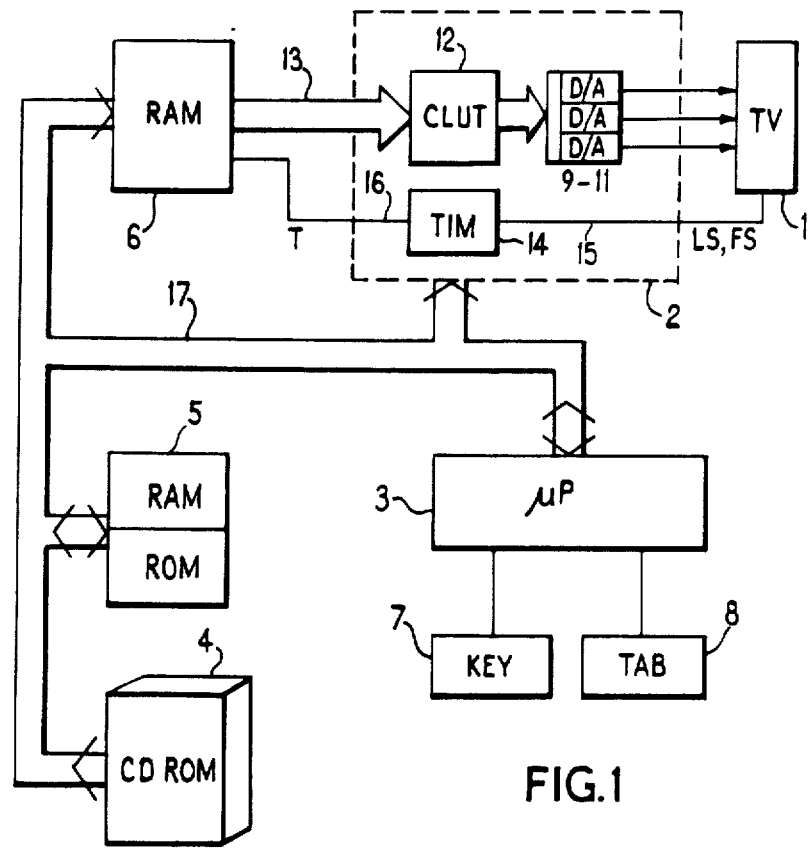
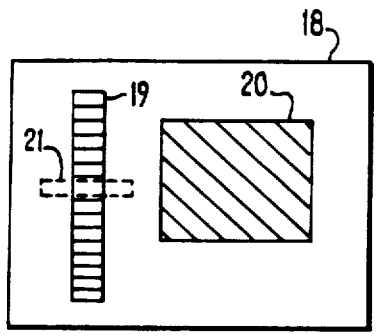
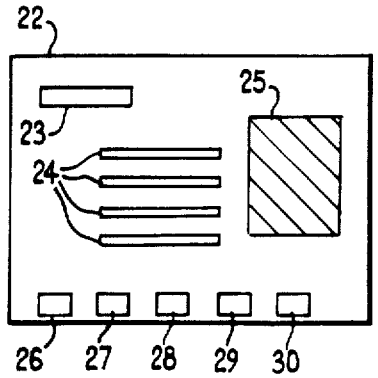
FIG.1
FIG.2
FIG.3

ELECTRONIC INFORMATION DISPLAY SYSTEMS

This invention relates to electronic information display systems comprising, a mass read-only memory which constitutes an information source from which information can be selected for display, a programme memory for storing programme and other control information, a display memory for storing in digital form a quantity (hereinafter referred to as a "page") of information selected from the mass memory for display as an entity on a display screen, a display device having said display screen, a display generator for producing video signals in accordance with the page information stored in the display memory for driving the display device, and processor means and associated user interface devices for controlling the selection and display of discrete pages of information from the mass memory.

As presently envisaged, the display generator of the system would be arranged to produce video signals which are suitable for driving a cathode ray tube (CRT) display device. However, the possibility does exist for the information display to be effected using some other form of display device, for instance, a liquid crystal display device. The video signals produced by the display generator would then be appropriate for such an alternative.

The system can be operable to display pages of information in the form of both pictures (graphics) and text, or as combinations of pictures and text, and with or without colour.

With the advent of low cost, high capacity, electronic digital storage devices, in particular an optical record carrier, for instance the so-called compact disc in its role as a CD ROM, an information system of the above type can have a mass memory which is sufficiently large for the system to be considered for use as a reference information display system. It is expected that such usage would be attractive as an alternative to an equivalent conventional printed reference information work such as a language dictionary, a vehicle maintenance manual, a cookery book, etc.

The article "Compact discs move from music to computers" in New Scientist, Nov. 15, 1984, at page 27 mentions the possible application of a CD ROM as a read-only memory which forms a computer data base that can store the entire contents of an encyclopedia.

The publication "Philips Technical Review", Volume 40, 1982, No. 6, comprises four articles which describe various constructional and functional features of the Philips Compact Disc Systems.

Assuming 8-bit bytes, a CD ROM can have a storage capacity of 600 M.bytes. A reasonable paper printed language dictionary contains around 80,000 entries which it has been calculated could be represented by 11 M.bytes of digitally coded text. Thus such a dictionary could easily be stored on a CD ROM. Even the full Oxford English Dictionary could be represented by only 230 M.bytes of digitally coded text which is also less than the available storage capacity of a CD ROM. However, simply encoding an existing printed dictionary and storing the resultant digitally coded text on a CD ROM will provide a text display which is inferior to the equivalent printed text in the dictionary, because a typical CRT display device can only display pages of text consisting of up to two thousand characters, which is far less than the number of characters which can make up a page of text of a printed dictionary. Thus, the large amount of information which can be stored may not in itself be sufficient to enable a satisfactory electronic reference information system to be implemented.

A particular problem is that a user of a dictionary may not in fact know accurately the spelling of a word to be referred to and would want to use the dictionary to fluid the correct spelling. Therefore, when access to the mass memory is based on an introduction into the system of the word required, the user is faced with an access problem. A possible solution is to access sequentially all the items of stored data, but this becomes impracticable when the number of items is very large, for instance it comprises 80,000 dictionary entries as mentioned above.

Another problem of accessing such a large number of items in a search operation is that the access time required makes the system cumbersome.

SUMMARY OF THE INVENTION

It is an object of the present invention to provide an electronic information display system which mitigates these problems by providing data access on an indexing basis from a selected part of a list of items identifying the stored data.

According to the invention, there is provided an electronic information display system of the type set forth above, wherein said mass memory contains a list of items of information and a set of data for each item on the list, each item having associated with it an address code for addressing the appertaining set of data, and each set of data comprising further information for its appertaining item, said processor means being operable:

(a) under control of an initialisation signal generated by a user interface device, to read the whole list of items and the appertaining address codes from the mass memory and store them in the programme memory;

(b) under control of a first select signal generated by the user interface device and indicating a region of the list of items, to read from the programme memory and store in the display memory a fixed number of items from said region of the list, starting from a first item identified by said first select signal;

(c) under control of at least one further select signal generated by the user interface device, to select one of the displayed items; the processor means being thereafter responsive:

(i) to fetch from the programme memory the address code appertaining to the selected item;

(ii) to address the mass memory with the fetched address code for reading therefrom the associated set of data and storing said set of data in the programme memory; and (iii) to cause the transfer of data from said set into the display memory for display.

It can be seen that an electronic information display system which is organised in accordance with the invention so as to constitute a reference information display system is more convenient for extracting reference information therefrom, compared with a system which, as aforesaid, has an information source which is simply a coded version of a paper printed reference work. By arranging the system so that at the outset of its operation, the processor means causes the list of items of information contained in the mass memory to be read out from that memory and written into the programme memory, there is obtained the advantage that the whole list of items is immediately available for selected parts thereof to be transferred to the display memory for display. By having the items of the list associated with their respective address codes which identify where the data portions for the item are locaed in the mass memory, so that these address codes are read out from the mass memory and written into the programme memory along with the list of items at the outset of the system operation, the selection of an item from a displayed selected part of the list invokes direct use of the appertaining address code(s) to obtain the relevant data portions for the item from the mass memory.

A preferred embodiment of an electronic information display system according to the invention is characterised in that the display generator is arranged for displaying a "select box" and means are provided for causing items of the displayed list to be displayed individually within this "select box", and that the user interface device comprises switch means to be activated by the user to produce said further (or final further) select signal in respect of the item currently displayed in the "select box".

The use of the "select box" offers a user friendly solution for realising the selection of an item from the displayed items.

When the set of data for some items pertains to more than one display page, each of such display pages may include at least one "select area" which pertains to an alternative page, the display including a cursor which is movable under the control of the user interface device and which when positioned in a "select area" signifies an operating condition in which activation of switch means on the user interface device will produce a command signal for causing the processor means to effect the display of the alternative display page. This also contributes to the user friendly aspect of the system.

An important implementation of a system according to the invention involves the use of a physically separable mass memory which is preferably an optical record carrier in combination with a suitable read apparatus. This renders the system suitable for use with different reference information sources.

In further considering the nature of the invention, reference will now be made by way of example to the accompanying drawings.

DESCRIPTION OF THE FIGURES

FIG. 1 shows a block diagram of an electronic information display system embodying the invention;

FIGS. 2 and 3 show respective formats for display pages produced by the system of FIG. 1.

DESCRIPTION OF THE PREFERRED EMBODIMENT

Figure 4:
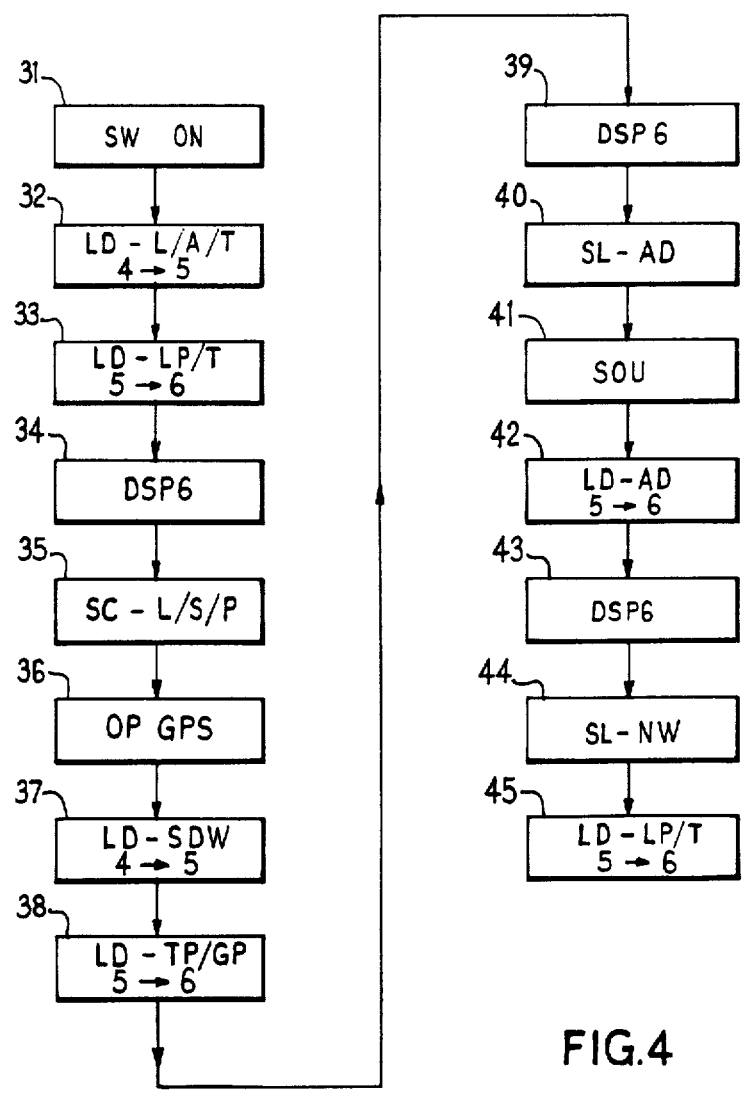
FIG. 4 shows in the form of a flow chart logic operations of the system to produce display pages.

Referring to the drawings, the electronic information display system shown in FIG. 1 comprises a display device 1, a display generator 2, a processor 3, a mass memory device 4, a programme memory 5, a display memory 6 and user interface apparatus 7 and 8. The display device 1 is suitably a colour television monitor which is connected to receive R,G,B, video signals from the display generator 2. These R,G,B, video signals are produced in the display generator 2 by three digital-to-analogue converters 9, 10 and 11, respectively. The display generator 2 also includes a colour look-up table 12 which is suitably a read/write memory and is responsive to dot information from the display memory 6 over a bus 13 to produce digital signals for driving the converters 9, 10 and 11. A display timer 14 in the display generator 2 provides line and field synchronisation signals LS and FS for the television monitor 1 over a connection 15. The timer 14 also provides over a connection 16 timing signals T for controlling the transfer of dot information from the display memory 6 to the colour look-up table 12.

The display memory 6 is suitably a random-access memory which has a capacity for storing dot information for at least one display page. The dot information would comprise one or more bits per dot to be displayed, depending on the range of colours afforded by the colour look-up table 12. A combined address/data bus 17 interconnects the display generator 2 and the display memory 6 with the processor 3. The programme memory 5, which is also at least partially a random-access memory, is also connected to the address/data bus 17. The programme memory 5 may also have a read-only memory part which contains permanent program data for controlling the "house-keeping" operations of the processor 3. The user interface apparatus comprises a keyboard data entry device 7 and a graphics tablet 8 respectively. The processor 3 can be a commercially available microprocessor, for instance the Signetics S68000 $\mu$P.

The mass memory device 4 is suitably a compact disc device and is also connected to the address/data bus 17. As discussed previously, a compact disc (CD ROM) of such a device has a storage capacity of 600 M.bytes. In accordance with the invention this compact disc (CD ROM) contains reference information appropriate for the system to function, for example, as an electronic dictionary. The criteria as to what form the reference information might take and the manner in which it can be selected for display is discussed below.

The designer of an electronic dictionary has to compete with the traditional paper version in which for text word definitions, a pronunciation guide and, in most cases, a derivation of the word are given. The pronunciation guide is not usually very helpful to the typical reader. Some dictionaries give a limmited set of synonyms or a few small pictures. One or two give some cross references to words with related meanings. One of the major problems faced by the paper dictionary designer is shortage of paper. The entries are packed close together with only limited use of page layout and many abbreviations are used. An example is the derivation of the word "oasis" which might read 'C17: via L Gk, prob. Egyptian'. This means 'Seventeenth century: via Latin from the Greek, probably Egyptian', when the abbreviations are expanded.

On the other hand, the great advantage of the paper dictionary is the readability of good print on paper. There is much experience in the use of a mixture of type styles (eg bold and italic) for books such as dictionaries.

The electronic system designer has to exploit the flexibility of the electronic system while trying to mitigate the readability problems usually associated with electronic text displays.

The table below shows that an electronic dictionary can give more facilities than an original paper dictionary from which it may be derived, and aims at improving on those already present in the paper dictionary.

|  | PAPER DICTIONARY | ELECTRONIC DICTIONARY |
| --- | --- | --- |
| Text definition: | Good definitions given in good quality, but small print, and with poor layout and many abbreviations. | The same definitions with abbreviations expanded and better layout. |
| Pictures: | Not usually provided. | Large coloured pictures with all appropriate words. |
| Sound: | Phonetic guide is usually inadequate. | The word is spoken clearly. |
| Synonyms/ antonyms: | A few sometimes provided. | A comprehensive set provided with easy access and backtracking. |
| Word relationships: | Not usually present. | Can readily additionally be provided. |

There is contained in the compact disc (CD ROM) of the mass memory device 4 a set of data for each of the text words that make up the dictionary. For each text word, the set of data comprises a text portion giving a test definition and a sound portion giving an audible pronunication. A graphics portion giving a picture definition is also provided for many text words. Where appropriate, auxiliary text portions for synonyms/antonyms and word relationships are also provided in the set of data for a text word. The compact disc (CD ROM) also contains display data for a dictionary title page and a full list of the text words, together with address data giving the address where the set of data for each text word is located in the compact disc (CD ROM).

In operation of the system, data which is selected for display from the compact disc (CD ROM) is presented in, for example, a 320×250 resolution dot matrix colour graphics display on the display device 1. A user controls the display by means of the keyboard device 7 and the graphics tablet 8.

When the system is first switched on, the display data for the full list of words together with the address data and the title page, is read from the compact disc (CD ROM) and written into the random access portion of the programme memory 5. The title page data is read from the programme memory 5 and dot information therefor is written into the display memory 6 to cause the title page to be displayed. The list of words can be accessed at any word in the list. Such a word is selected by a select signal generated by the keyboard device 7 and forms a datum word which is the first word of a displayed selected part of the list. Suitably, a select signal is generated upon depressing a key of the keyboard device 7, for example the key representing the first letter of the datum word. The displayed words can be scrolled up or down so as to contain adjacent words progressively. This scrolling is effected by stroking the graphics pen of the graphics tablet up or down. However, since the full list of words is large, it becomes more practicable to select an initial part comprising a predetermined number of items of the full list for display, as aforesaid, using the keyboard device 7, rather than scroll extensively until a desired part of the list is displayed. It can be arranged that a number of words at the beginning of the list can be displayed automatically with the title page data at the outset of the operation.

FIG. 2 shows the format for a display page 18 containing the displayed part of the list of words. This displayed part is represented by the oblong strip 19. Other text, which remains static when the displayed list is scrolled, for instance the title and graphics symbol for the electronic dictionary, is represented by the hatched rectangle 20. The display page 18 also includes a "select box" 21 which the words of the displayed list enter in turn when the list 19 is scrolled. When a word on the list 19 is located in the "select box" 21, activation of a dedicated switch of the graphics pen of the graphics tablet 8 or a dedicated key on the keyboard device 7 will produce a command signal which causes a set of data for that word to be read from the compact disc (CD ROM) 4 and written into the programme memory 5. The set of the data is read from an address location whose address is formed by the address code associated with the selected word. The text portion of that data is then read from the programme memory 5 and written into the display memory 6 for display as at least one display page. Where the set of data includes a graphics portion, this would normally be displayed with the text portion in the same display page.

FIG. 3 shows the format for a typical display page 22 for a text word definition. The text word itself is located at the top left-hand corner of the page as represented by the strip 23. Strips 24 represent the text definition for the text word, and the shaded rectangle 25 represents a graphics picture for the text word. The display page also includes a number of small rectangles 26 to 29. These constitute "select areas" by which auxiliary aspects of the text word can be selected. Conveniently, a selection is made by providing on the display screen a cursor which is moved under the control of the graphics pen. When the cursor is located on one of these "select areas", activation of the switch of the graphics pen will cause the selection of the auxiliary aspect of the text word.

For instance, in the embodiment being described the area 26 may be for selecting a sound pronunication of the text word, the area 27 may be for selecting an auxiliary display page relating to synonyms/antonyms of the text word, the area 28 may be for selecting an auxiliary display page relating to word relationships for the text word and the area 29 may be for selecting a display page giving the derivation of the word. When any one of these auxiliary pages is selected the auxiliary data therefor in the programme memory 5 is read out and written into the display memory 6 in place of the data currently being used for the subsisting display page. The sound pronunication when selected, is provided concurrently with the display. A further "select area" 30 is for indexing display pages. Where a definition is two large to be displayed on one display page, the area 30 has a "next page" function. When a display page other than the first is being displayed there is also provided a "select area" (not shown) which has a "last page" function. The auxiliary display pages would have a "select area" which has a "restore" function, selection of which will cause the system to revert to the main (or first) display page containing the text definition. Another "select area" (not shown) provides for the re-display of the list of words (FIG. 2), so that a new word can be selected.

Each auxiliary display page for "related words" would have each such word displayed in a "select area". When a word thus displayed is selected, the same operations pertain as for the selection of word using the "select box" 21 in the displayed list of words.

The foregoing operations of the system are summarised in the flow chart shown in FIG. 4. In this flow chart the legends in the information boxes have the following meanings.

| | | |
|---|---|---|
| 31 - SW ON | | When the system is switched-on, initialisation occurs to set various counters, flags, indicators, etc., to their starting value. |
| 32 - LD-L/A/T | 4 → 5 | The items for the list of words, the addresses for the sets of data in the CD ROM and the title page data, are read from the mass memory 4 and written into the RAM portion of the programme memory 5. |
| 33 - LD-LP/T | 5 → 6 | The data for the title page (and may be for an initial list of words to be displayed), are read from the programme memory 5 and written into the display memory 6. |
| 34 - DSP 6 | | The contents of the display memory 6 are displayed by the display device 1. |
| 35 - SC-L/S | | The part of the list to be displayed is selected (or altered) by a user, by keyboard selection, and the selected part is the displayed. |
| 36 - OP GPS | | The command signal is produced for the selected word entered in the "select box"; e.g. by activating the switch on the graphics pen. |
| 37 - LD-SDW | 4 → 5 | The set of data for the selected word is read from the mass memory 4 and written into the programme memory 5. |
| 38 - LD-TP/GP | 5 → 6 | The text portion (and graphics portion when provided) for the selected word is read from the programme memory 5 and written into the display memory 6. |
| 30 - DSP6 | | The new contents of the display memory 6 are displayed by the display device 1. |
| 40 - SL-AD | | Using the of the "select areas" (26–30, FIG. 3), auxiliary data for the selected word is selected. |
| 41 - SOU | | The sound pronunication is selected using one of the "select areas". |
| 42 - LD-AD | 5 → 6 | The selected auxiliary data is read from the programme memory 5 and written into the display) memory 6. |
| 43 - DSP6 | | The new contents of the display memory 6 are displayed by the display device 1. |
| 44 - SL-NW | | Using one of the "select areas", the displayed list of words is selected for re-display. |
| 45 - LD-LP/T | 5 → 6 | Step 33 above is repeated. Thereafter, a new word can be selected as set forth in steps 34 to 43. |

It will be apparent from the foregoing that the invention can also be used to provide an electronic equivalent to other forms of printed reference information works, such as a vehicle maintenance manual and a cookery book.

We claim:

1. An electronic information display system comprising, a mass read only memory which constitutes an information source from which information can be selected for display, a programme memory for storing programme and other control information, a display memory for storing in digital form a page of information selected from the mass memory for display as an entity on a display screen, a display device having said display screen, a display generator for producing video signals in accordance with the page information stored in the display memory for driving the display device, and processor means and associated user interface devices for controlling the selection and display of discrete pages of information from the mass memory, said mass memory containing a list of items of information and a set of data for each item on the list, each item having associated with it an address code for addressing the appertaining set of data and each set of data comprising further information for its appertaining item, said processor means being programmed for:

(a) under control of an initialisation signal generated by a user interface device, reading the whole list of items and the appertaining address codes from the mass memory and storing them in the programme memory;

(b) under control of a first select signal generated by the user interface device and indicating a region of the list of items, reading from the programme memory and storing in the display memory a fixed number of items from said region of the list including a first item identified by said first select signal;

(c) under control of at least one further select signal generated by the user interface device, selecting one of the displayed items; and the processor means thereafter:

(i) fetching from the programme memory the address code appertaining to the selected item;

(ii) addressing the mass memory with the fetched address code and reading therefrom the associated set of data and storing said set of data in the programme memory; and (iii) transferring data from said set into the display memory for display.

2. An electronic information display system as claimed in claim 1, wherein the display generator displays a select box and means are provided for causing items of the displayed list to be displayed individually within said select box, and the user interface device comprises switch means to be activated by the user to produce said further select signal identifying the item displayed in the select box.

3. An electronic information display system as claimed in claim 1, wherein the set of data for some items pertains to more than one display page and in that each such display page includes at least one select area which pertains to an alternative page, the display including a cursor which is movable under the control of the user interface device and which when positioned in a select area signifies an operating condition in which activation of switch means on the interface device will produce a command signal for causing the processor means to effect the display of the alternative display page.

4. An electronic information display system as claimed in claim 1, wherein said mass memory is physically separable from the system.

5. An electronic information display system as claimed in claim 1, wherein said mass memory comprises an optical record carrier in combination with a suitable read apparatus.

6. For use in a system as claimed in claim 1, wherein a compact disc containing reference information serves with a disc player as said information source.

7. An electronic information display system comprising:

a mass read only memory which constitutes an information source from which information can be selected for display containing a list of items of information and a set of data for each item on the list, each item having associated with it an address code for addressing the appertaining set of data and each set of data comprising further information for its appertaining items;

a programme memory for temporarily storing a portion of information stored in said mass read only memory;

a display memory for storing in digital form a page of information selected from the mass memory for display as an entity on a display screen;

a display device having said display screen;

a display generator for producing video signals in accordance with the page information stored in the display memory for driving said display device;

a user interface device for controlling the selection and display of discrete pages of information from said mass memory;

means for reading the whole list of items and the appertaining address codes from the mass memory and storing them in said programme memory in response to an initialization signal generated by said user interface device;

means for reading from the programme memory and storing in the display memory a fixed number of items from a region of the list including a first item, said region and first item being identified by a first select signal generated by said user interface;

means for selecting one of the displayed items by said user interface device, and fetching from said programme memory the address code appertaining to the selected item;

means for addressing said mass memory with the fetched address code and reading therefrom the associated set of data and storing said set of data in the programme memory; and means for transferring said set of data from said programme memory into said display memory for display.

8. The display system of claim 7 wherein said display generator displays a select box containing said items of said displayed list, and further comprises:

means for individually displaying items of said list in said select box; and a user activated switch means for producing a further select signal identifying an individual item for display in said select box.

9. The display system of claim 7 wherein said mass memory comprises an optical record and an associated addressing and reading apparatus for locating data on said optical record.

* * * * *